Figure 1:
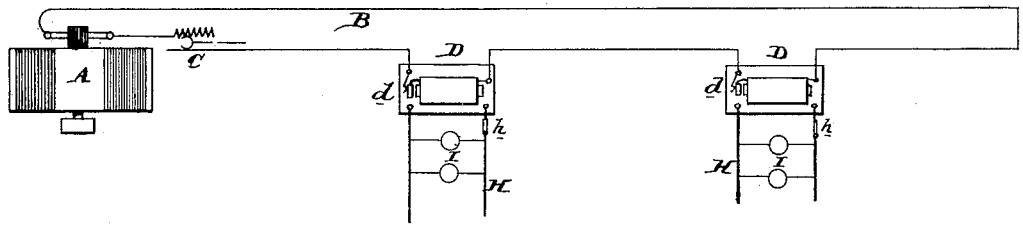

(No Model.)

R. M. HUNTER.
TRANSMISSION OF ELECTRICAL ENERGY.

No. 596,042. Patented Dec. 21, 1897.

Attest
Geo. B. Lauer.
C. M. Dittrich.

Inventor

UNITED STATES PATENT OFFICE.

RUDOLPH M. HUNTER, OF PHILADELPHIA, PENNSYLVANIA, ASSIGNOR TO THE GENERAL ELECTRIC COMPANY, OF NEW YORK.

TRANSMISSION OF ELECTRICAL ENERGY.

SPECIFICATION forming part of Letters Patent No. 596,042, dated December 21, 1897.

Original application filed June 18, 1887, Serial No. 241,729. Divided and this application filed April 20, 1892. Serial No. 429,835. (No model.)

*To all whom it may concern:*

Be it known that I, RUDOLPH M. HUNTER, of the city and county of Philadelphia and State of Pennsylvania, have invented an Improvement in Transmission of Electrical Energy, of which the following is a specification.

My invention has reference to the transmission of electrical energy; and it consists of certain improvements which are fully set forth in the following specification and shown in the accompanying drawings, which form a part thereof.

This application (Case No. 218) is a division of my application, Serial No. 241,729, filed June 18, 1887.

Prior to the date of my invention electric currents were commonly supplied directly to the electric lamps or motors, and hence the electromotive force and volume of current required by the lamps or motors was also required to be supplied to the line-circuit. In circuits of great length or where great volumes of current are required the supply-conductors must be very large and are necessarily expensive. This is particularly so in incandescent lighting, where the generating plant is located at great distance from the lamps.

In systems where the incandescent plants in the houses are separated by great distances and are supplied from a single generating-station common to all of them the expense of construction often renders the undertaking unprofitable.

The object of my invention is to overcome the above and many other attendant objections.

I am enabled to generate the line-current at a central station and supply it in the form of high-tension currents to the places of use, and then by means of a secondary generator or induction-coil I produce secondary currents of low tension which are supplied to a local or secondary circuit including the lamps or other translating devices at the said places of use. As many secondary generators as desired may be in circuit with the same line-circuit and may supply currents to as many separate lighting plants. Each of these secondary generators may be controlled to supply whatever current is desired irrespective of the others, or one or more of the local circuits may be cut out without materially affecting the line-current. If desired, the secondary generators may be regulated simultaneously from one place on the line by simply varying the line-current. Such generators may be put on high-tension or arc-lighting circuits and by properly proportioning the diameters of the wire in the two coils of the secondary generator currents of the desired tension may be generated for local use without interfering with the line-circuit.

The interruption of the primary current may be in the primary dynamo-electric generator or at the secondary generator or induction-coil, the principle in its broad sense being the same. While the secondary generator is an induction-coil, it is to be understood that the interrupted current is the high-tension primary current and is passed through the fine-wire coil, whereas the induced or secondary current is of low tension and supplied to the local or secondary circuit. It might be in the form of a simple induction-coil with or without magnetizable metal upon or between which the coils are wound or may be like a Rhumkorff coil with the provision of the interrupter in the high-resistance circuit in place of the low-resistance circuit, as was heretofore customary. The change enables the production of the results herein set out.

I do not limit myself to any details of construction for accomplishing the results of the system herein described, as my invention also includes the method of transmitting electrical energy by the use of secondary generators or induction-coils in the manner herein provided.

Figure 2:
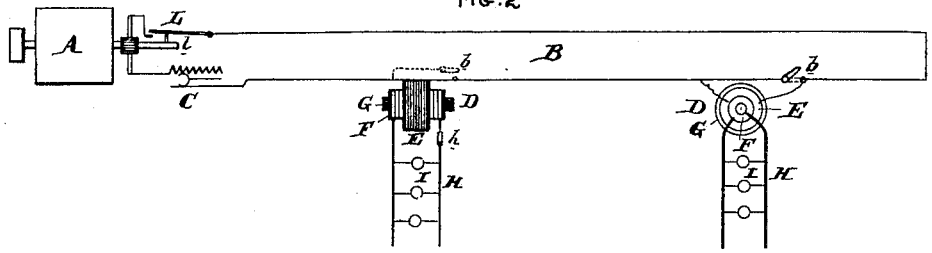

In the drawings, Figure 1 is a diagram showing one construction of apparatus for carrying out my invention, and Fig. 2 is a similar view of another form of apparatus.

A represents a dynamo-electric machine or primary generator.

B is the line or primary line conductor of preferably high resistance, and may have a regulator C of any suitable construction, if desired.

D represents the secondary generators or induction-coils, of which E is the primary or fine-wire coil, F is the secondary or coarse-wire coil, and G is the magnet core or sheath. The fine-wire coil is in circuit with the line D, and the coarse-wire coil is in circuit with the local circuit H of low resistance.

I represents incandescent lamps, motors, or other translating devices preferably arranged in multiple with the coarse-wire coil F. The local circuits H may have cut-out switches $h$, if desired, to cut out said local circuits H irrespective of the working of the line B.

In Fig. 1 the dynamo or electric generator A may be of any construction adapted to produce the necessary current. It is illustrated as a continuous-current machine, and the secondary generators have current-interrupting devices $d$ to interrupt the line or primary current.

In Fig. 2 the secondary generators are of the simple form having no interrupters, and a single interrupter L is used with a continuous-current machine A for interrupting the line-circuit and is shown as operated by the armature-shaft $l$. This interrupter may be operated in any suitable manner.

A shunt-circuit controlled by a switch $b$ may be employed to shunt the line-current around a secondary generator, if so desired, when not in use, so as to maintain the continuity of the line-circuit without the resistance of the secondary generator.

The currents generated will be maintained and practically uniform currents of high tension, and the currents induced will be maintained and practically uniform alternating currents and will be generated at the second station or place of consumption by the inductive influences of the high-tension currents.

I do not limit myself to any particular construction of elements here shown, as they may be modified in many ways without departing from my invention.

What I claim as new, and desire to secure by Letters Patent, is—

1. The improvement in the art of transmitting electrical energy to and utilizing it at a distance from the source, which consists in generating maintained and practically uniform currents of high tension at one station and sending the same over a line of conductors to another station, and generating maintained and practically uniform currents of lower tension at the second station by the inductive influence of the high-tension currents.

2. The improvement in the art of transmitting electrical energy to and utilizing it at a distance from the source, which consists in generating maintained and practically uniform currents of high tension at one station and sending the same over a line of conductors to another station, generating maintained and practically uniform currents of lower tension at the second station by the inductive influence of the high-tension currents, and converting these maintained low-tension currents into other forms of energy, such as heat, light, &c.

3. The improvement in the art of transmitting electrical energy to and utilizing it at a distance from the source, which consists in generating maintained and practically uniform alternating currents of high tension at one station and sending the same over a line of conductors to another station, and generating maintained and practically uniform alternating currents of lower tension at the second station by the inductive influence of the high-tension currents.

4. The improvement in the art of transmitting electrical energy to and utilizing it at a distance from the source, which consists in generating maintained and practically uniform alternating currents of high tension at one station and sending the same over a line of conductors to another station, generating maintained and practically uniform alternating currents of lower tension at the second station by the inductive influence of the high-tension currents, and converting these maintained low-tension alternating currents into other forms of energy, such as heat, light, &c.

5. The method of transmitting electrical energy consisting in transmitting an electric current of high tension and small volume over a line-circuit and at one or more places on the line-circuit, producing by means of induction maintained and practically uniform currents of low tension and relatively large volume, and supplying said low-tension currents to one or more translating devices in said local circuits.

6. The method of transmitting electrical energy consisting in transmitting an electric current of high tension and small volume over a line-circuit and at one or more places on the line-circuit, producing by means of induction-currents of low tension and relatively large volume and supplying said low-tension currents to one or more translating devices in said local circuits, and regulating the line-current to vary all of the currents in the local circuits simultaneously.

7. The combination of a dynamo-electric generator for generating a varying-potential or interrupted current, a line or primary circuit of high resistance, one or more induction-coils or secondary generators having their fine-wire coils in circuit with the line-circuit, one or more local or secondary circuits of low resistance respectively connected with the coarse-wire coils of the induction-coils, a resistance-changer in the line-circuit to vary the line-current, and switches to cut one or more of the local circuits out of action.

8. The combination of a dynamo-electric generator for generating a primary current of high tension, a line-circuit a secondary generator or induction-coil having its fine-wire coil included in the line or primary circuit, a local circuit including the coarse-wire coil of the secondary generator, an electric lamp or translating device in said local or secondary circuit and means to interrupt the current flowing over the line or primary circuit and through the fine wire of the secondary generator.

9. The combination of a dynamo-electric generator for currents of high tension, a line or primary circuit, a secondary generator having its fine-wire coil in circuit with the line, a local or secondary circuit in series with the coarse-wire coil of the secondary generator, two or more electric lamps or translating devices for currents of low tension in multiple connection with the local or secondary circuit, and a regulator to simultaneously control the current in the line and local circuit.

10. The combination of a dynamo-electric generator for generating currents of high tension, an induction-coil having a magnetic-metal pole, a line or primary circuit including the fine-wire coil, a current-interrupter for the line-circuit actuated by the magnetic pole of the induction-coil, a local or secondary circuit of low resistance in circuit with the coarse-wire coil of the induction-coil, and a translating device in said local or secondary circuit.

11. A secondary generator for electrical transmission of energy consisting of the combination of a fine-wire coil, a line-curcuit including the said fine-wire coil, an interrupter for the current passing through said fine-wire coil, and a coarse-wire coil wound parallel to the fine-wire coil, and a local circuit including the coarse-wire coil.

12. A secondary generator for electrical transmission of energy consisting of the combination of a fine-wire coil, a line-circuit including the said fine-wire coil, an interrupter for the current passing through said fine-wire coil, a coarse-wire coil wound parallel to the fine-wire coil, a local circuit including the coarse-wire coil, and a frame of magnetic material upon or within which the coils are wound.

13. The combination of a source of interrupted electric current of high tension, a line or primary circuit, a high-resistance coil in circuit with said line-circuit a low-resistance coil parallel and in close proximity to the high-resistance coil, a local or secondary circuit including said low-resistance coil, and a frame of magnetic material in close proximity upon which the coils are wound.

In testimony of which invention I have hereunto set my hand.

R. M. HUNTER.

Witnesses:
ERNEST HOWARD HUNTER,
S. T. YERKES.